United States Patent [19]

Veverka, et al.

[11] Patent Number: 5,040,774

[45] Date of Patent: Aug. 20, 1991

[54] HYDRAULIC DAMPING BUSHING

[75] Inventors: Susan I. Veverka, Elyria; Stephen F. Roth, Berlin Heights, both of Ohio

[73] Assignee: The Pullman Company

[21] Appl. No.: 506,209

[22] Filed: Apr. 9, 1990

[51] Int. Cl.⁵ .......................... F16F 13/00; F16F 5/00

[52] U.S. Cl. ................................. 267/140.1; 267/140.3

[58] Field of Search ...................... 267/140.1, 219, 220, 267/140.2, 140.3, 141.2–141.7; 180/300, 312, 902; 248/636, 562

[56] References Cited

U.S. PATENT DOCUMENTS

| | | |
|---|---|---|
| 2,535,080 | 12/1950 | Lee . |
| 2,670,812 | 3/1954 | Cuskie . |
| 2,670,813 | 3/1954 | Lewton et al. . |
| 3,105,574 | 10/1963 | Hoffman . |
| 3,164,381 | 1/1965 | Tuczek . |
| 3,642,268 | 2/1972 | Hipsher . |
| 3,698,703 | 10/1972 | Hipsher . |
| 3,721,417 | 3/1973 | Skala . |
| 3,874,646 | 4/1975 | Vernier . |
| 3,883,101 | 5/1975 | Vernier . |
| 3,888,449 | 6/1975 | Jablonski . |
| 4,005,858 | 2/1977 | Lochner . |
| 4,159,091 | 6/1979 | Le Salver et al. . |
| 4,161,304 | 7/1979 | Brenner et al. . |
| 4,199,128 | 4/1980 | Van der Boom et al. . |
| 4,215,842 | 8/1980 | Brenner et al. . |
| 4,262,886 | 4/1981 | Le Salver et al. . |
| 4,277,056 | 7/1981 | Ticks . |
| 4,288,063 | 9/1981 | Brenner et al. . |
| 4,383,679 | 5/1983 | Kakimoto . |
| 4,391,435 | 7/1983 | Pham . |
| 4,420,060 | 12/1983 | Kakimoto . |
| 4,432,537 | 3/1984 | Pletsch . |
| 4,437,653 | 3/1984 | Kakimoto . |
| 4,471,935 | 9/1984 | Chiba et al. ................. 267/141.2 X |
| 4,588,174 | 5/1986 | Konishi . |
| 4,673,314 | 6/1987 | Hara et al. ..................... 267/140.3 X |
| 4,728,086 | 3/1988 | Ishiyama et al. . |
| 4,768,760 | 9/1988 | Le Fol ............................ 267/140.1 |
| 4,848,756 | 7/1989 | Funahashi et al. ............. 267/140.1 |
| 4,872,650 | 10/1989 | Tabata et al. ................... 267/140.1 |
| 4,895,353 | 1/1990 | Roth et al. . |
| 4,899,997 | 2/1990 | Thorn .......................... 267/140.2 X |
| 4,907,786 | 3/1990 | Okazaki et al. .............. 267/140.3 X |
| 4,921,229 | 5/1990 | Hori ............................... 267/140.1 |
| 4,923,178 | 5/1990 | Matsumoto et al. ........... 267/140.1 |
| 4,936,555 | 6/1990 | Ishiyama et al. .............. 267/219 X |
| 4,936,557 | 6/1990 | Schwerdt ...................... 267/140.1 |
| 4,941,649 | 7/1990 | Funahashi et al. ............ 267/219 X |

FOREIGN PATENT DOCUMENTS

| | | |
|---|---|---|
| 838403 | 12/1952 | Fed. Rep. of Germany . |
| 2833776 | 1/1980 | Fed. Rep. of Germany . |
| 642711 | 3/1927 | France . |
| 2168680 | 8/1973 | France . |
| 60-184740 | 9/1985 | Japan . |
| 0098039 | 5/1987 | Japan ................................. 267/219 |
| 0184249 | 8/1987 | Japan ................................. 248/562 |
| 2033534 | 5/1980 | United Kingdom . |
| 2041485 | 9/1980 | United Kingdom . |
| 2200190 | 7/1988 | United Kingdom .............. 267/219 |

Primary Examiner—Douglas C. Butler
Attorney, Agent, or Firm—John D. Kaufmann

[57] ABSTRACT

A vibration damping device of the bushing-type includes a rigid outer housing and a rigid inner member, having a first side and a second side, which is substantially enclosed by the outer housing. A first vibration absorbing resilient body is interposed between the first side of the inner member and the outer housing. The first body is made of an elastomeric material having a first spring rate. A second vibration absorbing resilient body is interposed between the second side of the inner member and the outer housing. The second body is made of an elastomeric material having a second spring rate which is different from the first spring rate such that a deflection of the rigid inner member toward one of the first and second bodies will be resisted more strongly than a deflection of the rigid inner member toward the other of the first and second bodies. A first fluid chamber is defined in the second body and a second fluid chamber is defined between the second body and the outer housing. The second fluid chamber is in fluid communication with the first chamber through a first fluid passageway. A plate is moveably mounted in the first passageway for movement perpendicular to a longitudinal axis of the device. The plate controls a flow of fluid through the first passageway to a varying extent depending upon the position of the plate in the first passageway. A second fluid passageway communicates with the first and second fluid chambers through a circuitous path.

21 Claims, 4 Drawing Sheets

HYDRAULIC DAMPING BUSHING

BACKGROUND OF THE INVENTION

The present invention relates generally to damping devices. More specifically, this invention relates to a fluid filled elastomeric bushing-type damping device which is used for connecting a vibrating element or assembly, that produces varying types of vibrations, to a rigid support member.

The invention will be described particularly in connection with a fluid filled elastomeric damping device of the fluid bushing type, which isolates an internal combustion engine, such as may be used in a vehicle, from the support frame of the engine. However, it should be appreciated that the invention has broader applications and may be used for the absorption of shocks, structural leveling, and energy dissipation in a variety of other environments as well.

In the typical vibration isolating engine mount, a body of natural or synthetic rubber is normally employed. While these elastomeric mounts can be designed to operate in a generally satisfactory manner, such materials inherently have a low coefficient of damping which limits their ability to isolate certain objectionable vibratory inputs to the vehicle, such as those particularly disturbing to a modern lightweight unitized vehicle body and frame construction. An increased damping coefficient is possible by the selection of certain rubber polymers and the use of additives. This technique has, however, thus far proven unsatisfactory because of accompanying adverse effects on other properties of the rubber. Also, increasing the damping coefficient produces large damping for all vibratory inputs regardless of frequency or amplitude. This is undesirable in an engine mount, particularly when the engine experiences low amplitude, high frequency vibrations.

It is well known that for best performance in a hydraulic elastomeric engine mount, damping should be at a maximum at the natural frequency of the mount system. It is also desirable that the engine mount be able to handle two distinctly different types of vibrations in different ways. More specifically, low frequency vibrations of relatively large amplitude should be damped in such a way that high frequency vibrations of relatively small amplitude remain relatively undamped but are isolated. Unfortunately, a design for successfully damping high amplitude vibrations on the order of 0.3 mm or greater, generally will also damp low amplitude vibrations, on the order of 0.1 mm or less. Various schemes have addressed this problem with some success. Many of the schemes are based on the use of two fluid filled chambers between which is positioned a partition member that is capable of limited free motion.

One of these devices, for example, is an axial or strut-type damping system which provides two fluid filled chambers in which a partition member permits only limited fluid movement between the chambers. Axial damping devices are, however, complex in design, weigh more, and are more expensive to manufacture, as well as needing to be larger in size than engine mounts in the form of bushings. Bushing-type engine mounts are also advantageous over axial mounts for safety reasons. In this connection, bushing-type engine mounts better restrain a vehicle engine against movement during a crash than do axial mounts. Additionally, bushing-type mounts are advantageous over axial mounts since they are better able to damp a rocking motion of the engine. Such a motion is frequently encountered in transaxle mounted engines in front wheel drive vehicles.

Bushing-type damping devices attempting to solve this problem have also been found to be inadequate. More specifically, conventional bushing designs have found difficulty in successfully handling both high frequency, low amplitude vibrations and low frequency, high amplitude vibrations. One known class of bushing-type damping device is capable of successfully handling both of these types of vibrations. However, even this known class is incapable of restraining the amplitude of vibrations of the vehicle engine within desired ranges. Another problem with conventional elastomeric damping devices for internal combustion engines is that due to the general downsizing of cars, less room is available in the engine compartment for the engine. Accordingly, if the vibrations which need to be damped are of too large an amplitude, the engine may contact other elements housed in the engine compartment or the hood with deleterious results.

Accordingly, it has been considered desirable to develop a new and improved vibration damping device in which the damping response and spring rate to structural agitation is varied in two different directions and which would overcome the foregoing difficulties and others while providing better and more advantageous overall results.

BRIEF SUMMARY OF THE INVENTION

In accordance with the present invention, a new and improved bushing-type damping device is provided which is simple in design, economical to manufacture, readily adaptable to a plurality of suspension and mounting member uses with items having a variety of dimensional characteristics and operating vibrations, and which provides a load carrying suspension with improved shock absorption and energy dissipation characteristics.

More particularly, in accordance with this aspect of the invention, the bushing-type device comprises a rigid inner member having a first side and a second side and a rigid outer member housing which is axially parallel to the inner member and encloses a substantial portion thereof. A first vibration absorbing resilient body is interposed between the first side of the inner member and the outer housing. The first resilient body comprises an elastomer having a first spring rate. A second vibration absorbing resilient body is interposed between the second side of the inner member and the outer housing. The second resilient body comprises an elastomer having a second spring rate which is different from the first spring rate.

According to another aspect of the invention, a vibration damping device of the bushing-type is provided. In accordance with this aspect of the invention, the device comprises a rigid outer housing and a rigid inner member which is substantially enclosed by the outer housing, with the inner member having a first side and a second side. A first vibration absorbing resilient body is interposed between the first side of the inner member and the outer housing. The first body comprises an elastomeric material having a first spring rate. A second vibration absorbing resilient body is interposed between the second side of the inner member and the outer housing. The second body comprises an elastomeric material having a second spring rate which is lower than the first spring rate such that a deflection of the rigid inner member toward the first body will be resisted more strongly than a deflection toward the second body. A first fluid chamber is defined in the second body. A second fluid chamber is defined between at least the second body and the outer housing. The second fluid chamber is in fluid communication with the first chamber through a first fluid passageway. A plate is movably mounted in the first passageway for movement perpendicular to a longitudinal axis of the device for controlling a flow of fluid through the first passageway to a varying extent depending on the position of the plate in the first passageway. A second fluid passageway communicates with the first and second chambers through a circuitous path.

One advantage of the present invention is the provision of a new and improved bushing-type damping device which functions as if it had different stiffnesses depending upon the amplitude and frequency of the vibrations to which it is subjected.

Another advantage of the present invention is the provision of a bushing-type vibration damping device having a simple construction that is very reliable in operation and offers good damping characteristics at the natural frequency of the mount system and at low frequency, high amplitude structural agitation while avoiding damping, and consequently a high dynamic spring rate, at high frequency, low amplitude structural agitation.

Still another advantage of the present invention is the provision of a bushing-type damping device which has separate distinct elastomeric elements with different spring rates so that a vibration in a first direction will be resisted more strongly than a vibration in a second and opposite direction.

Yet another advantage of the present invention is the provision of a bushing-type damping device in which a partition member is arranged to have limited travel in a passageway separating a pair of fluid holding chambers.

An additional advantage of the present invention is the provision of a bushing-type damping device employing a partition member which is housed in a containerized unit that can be replaced to allow the same base part and different containerized units to be "tuned" for different vibration amplitudes or frequencies.

A further advantage of the present invention is the provision of a bushing-type fluid damping device which is designed to damp engine rebound such as when the engine is put in reverse or when the car encounters a chuck hole, pot hole, railroad tie or the like during its travel.

A still further advantage of the present invention is the provision of a bushing-type damping device which is so designed that it could be easily used in an active damping system.

A yet further advantage of the present invention is the provision of a bushing-type damping device having a rigid inner member located in a rigid outer housing with the inner member being provided with a pair of wings that can control a radial deflection of the bushing as well as provide support for long downstrokes of the bushing.

Still other objects and advantages of the invention will become apparent to those skilled in the art upon a reading and understanding of the following detailed specification.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figure 6:
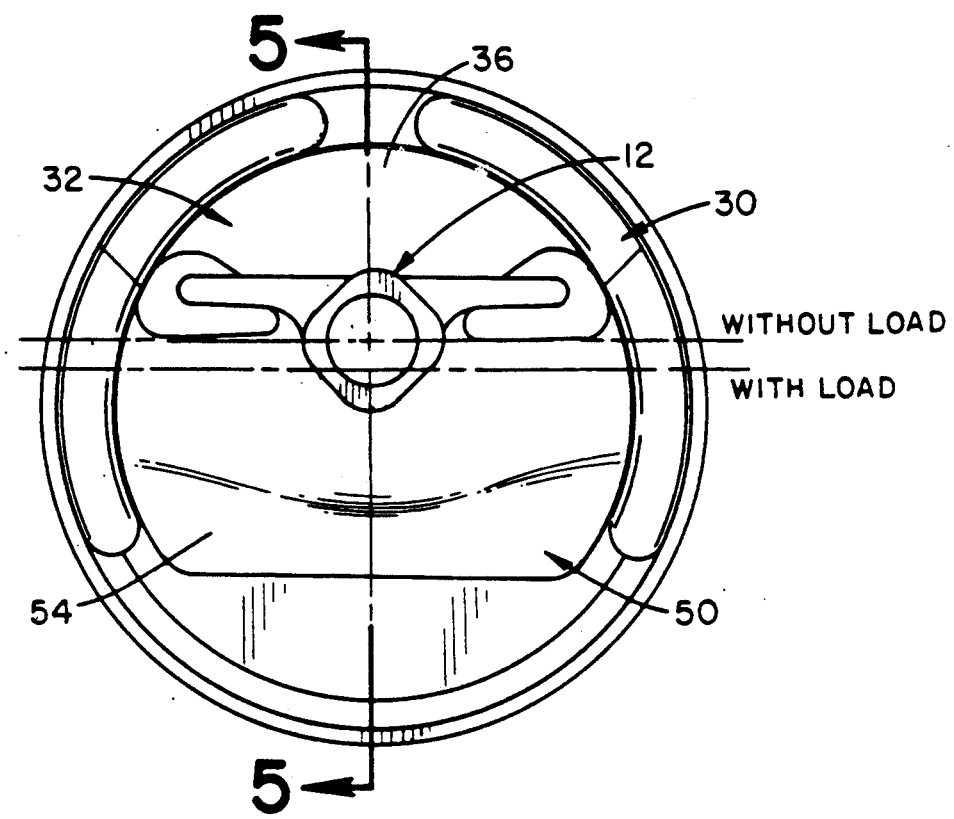
FIG. 6 is an end elevational view of the damping device of FIG. 1.

Referring now to the drawings, wherein the showings are for the purpose of illustrating a preferred embodiment of the invention only and not for purposes of limiting same, FIG. 6 shows the preferred embodiment of the subject new damping device in the way of a bushing-type engine mount A. While the damping device is primarily designed for and will hereinafter be described in connection with a bushing which is mounted between an automotive engine and its frame, it will be appreciated that the overall inventive concept involved could be adapted for use in a wide variety of other vibration damping environments as well.

Figure 2:
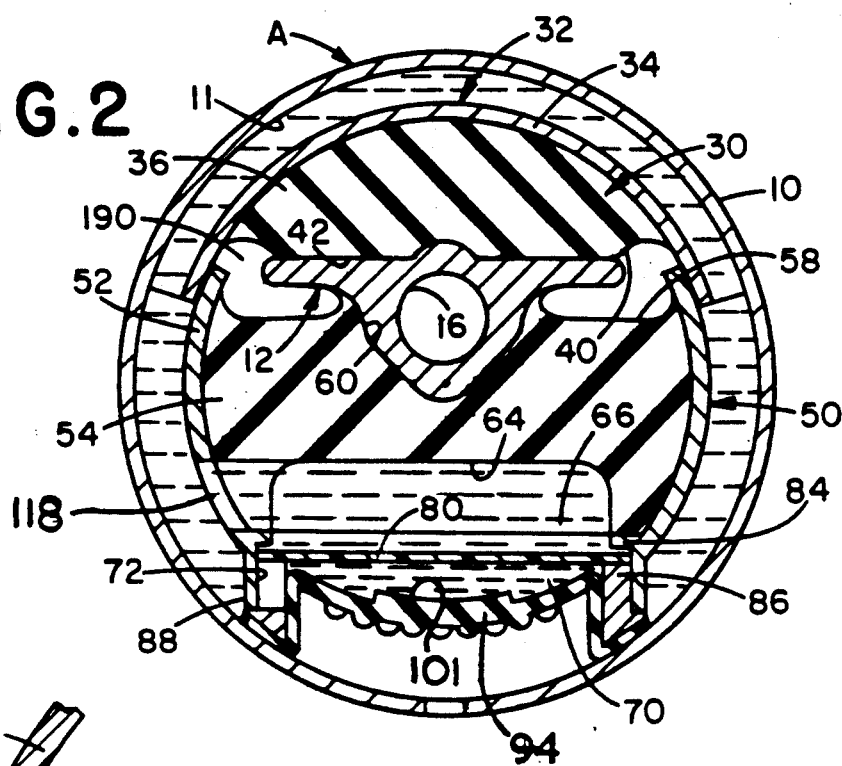
FIG. 2 is an enlarged cross-sectional view of the device of FIG. 1 in an assembled condition.
Figure 3:
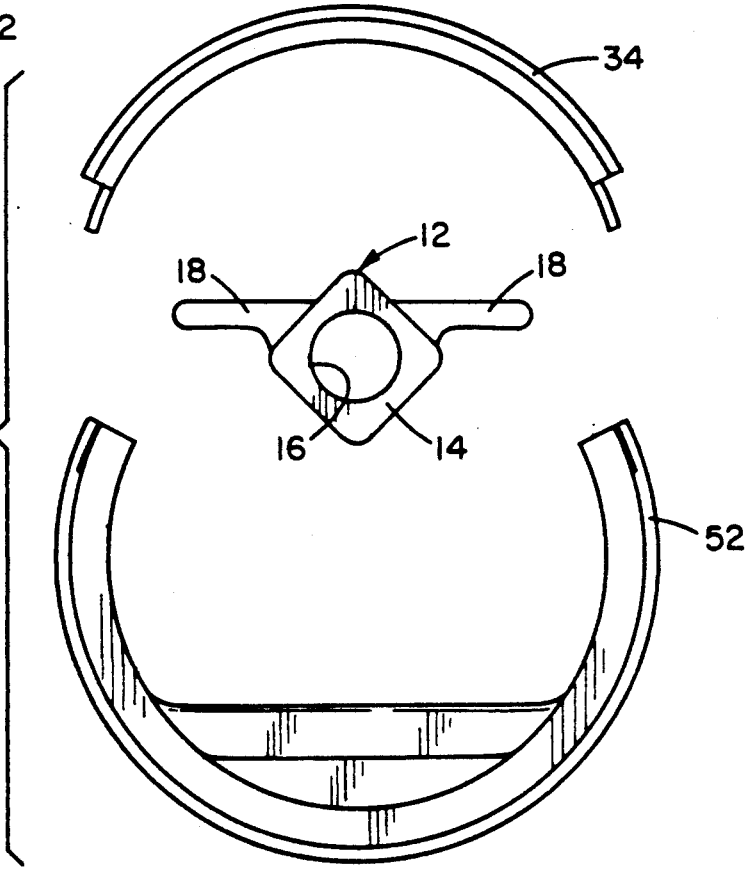
FIG. 3 is an exploded and elevational view of several metallic support elements of the device of FIG. 1 shown separate from the elastomeric material that envelops them.
Figure 5:
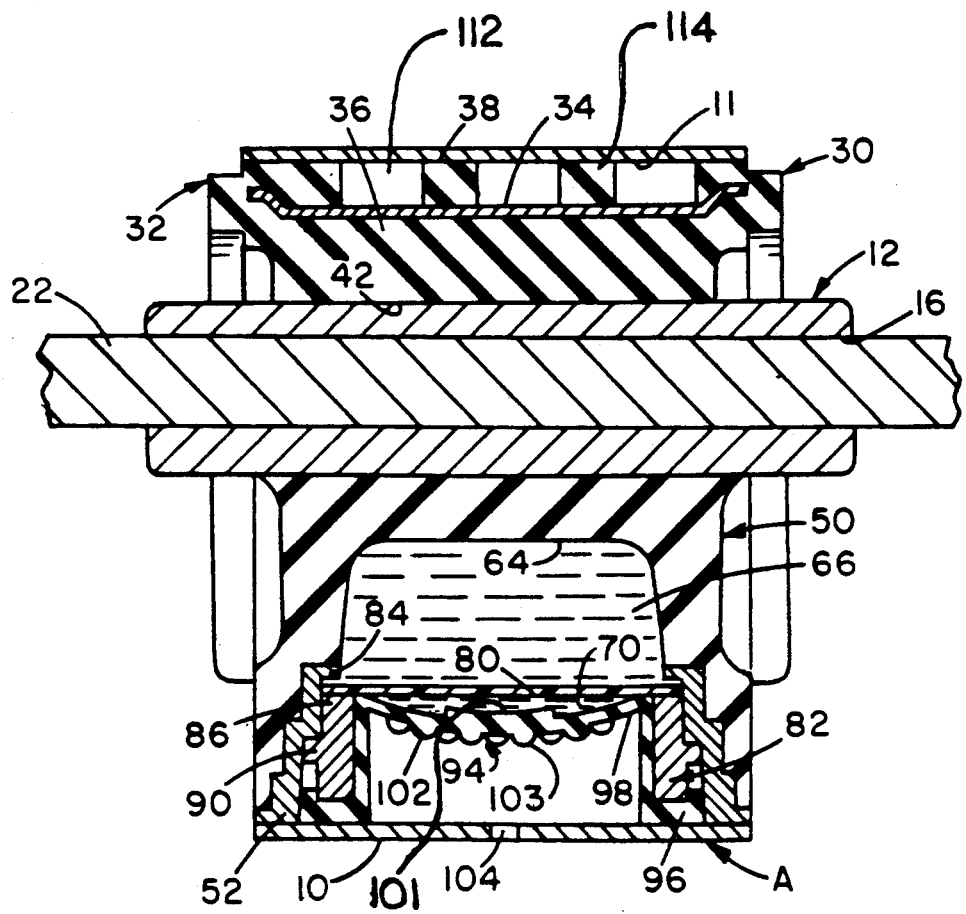
FIG. 5 is a longitudinal cross-sectional view through the damping device of FIG. 1.

With particular reference to FIGS. 2 and 5, the bushing A is a hydraulic-elastomeric mount which includes a rigid, preferably metallic, cylindrical outer housing 10 having an inner face 11 and a rigid, preferably metallic, inner sleeve 12. These two elements are adapted for use between an engine (not illustrated) and a frame (not illustrated) holding the engine. As best shown in FIG. 3, the inner sleeve 12 can include a substantially diamond shaped hollow body 14 having a central bore 16 extending longitudinally therethrough, as well as a pair of arms or wings 18 that extend radially outwardly from one side of the body 14. As shown in FIG. 5, a support bar 22, which can be connected either to the engine or to the frame, extends through the bore 16 of the inner sleeve 12. The outer housing 10 and the inner sleeve 12 are generally annular in cross-sectional configuration which is a conventional configuration for engine mount devices of the bushing-type and in which the outer member substantially encircles the inner member. It should be noted that the housing 10 and sleeve 12 could be made of any suitable conventional material as desired, but are preferably made of a suitable conventional metal, such as aluminum, or the like.

As is evident from FIGS. 2 and 5, the inner sleeve 12 and the outer housing 10 are axially parallel with each other, but the longitudinal axis of the sleeve 12 is preferably spaced away from the longitudinal axis of the housing 10 in the embodiment illustrated to optimize performance characteristics for a set space limitation. It should be recognized, however, that other configurations of these elements could also be employed as required.

An elastomeric spring assembly 30 is interposed between the inner sleeve 12 and the outer housing 10. The spring assembly 30 comprises an upper section 32 which includes a rigid spine member 34 that can be made, for example, of a suitable metallic material that is embedded in an elastomeric body 36. A housing engaging face 38 (FIG. 1) of the body 36 contacts the inner face 11 of the outer housing 10. An inner face 40 of the upper section 32 is provided with a sleeve engaging surface 42.

Figure 2A:
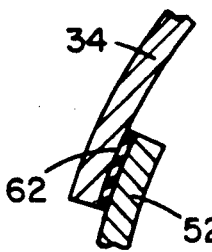
FIG. 2A is a magnified view of a portion of FIG. 2.

A lower section 50 of the elastomeric spring assembly 30 includes a rigid spine 52 which can be made, for example, of a suitable metallic material that is embedded in an elastomeric body 54. An inner face 58 of the body 54 has a sleeve engaging surface 60. The sleeve engaging surface 60 is bonded to the inner sleeve 12 as shown in FIG. 2. The bond is achieved with conventional chemical bonding techniques. As shown in FIG. 2A, the rigid spine 34 of the first section does not come in contact with the rigid spine 52 of the second section, but is rather separated therefrom by a portion 62 of the compressed rubber for sealing purposes.

Figure 1:
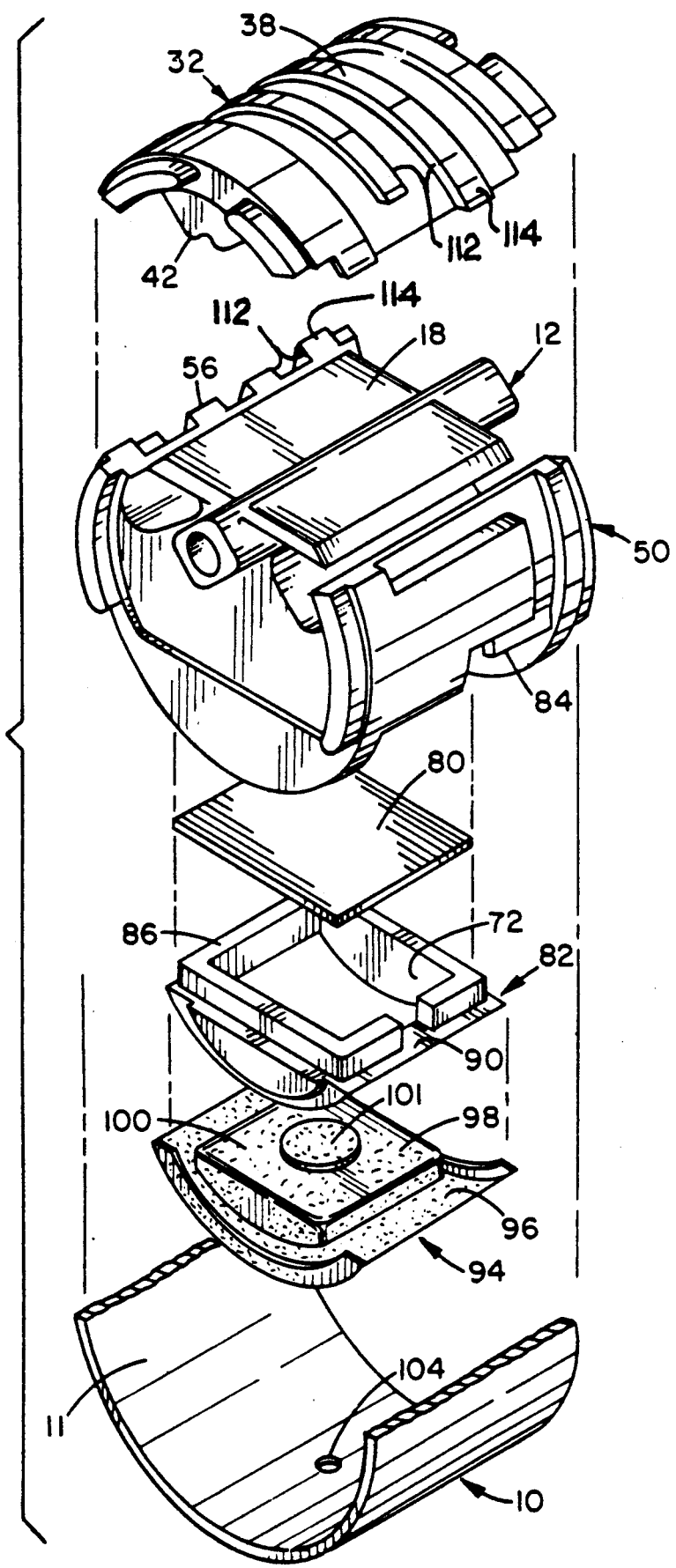
FIG. 1 is an exploded perspective view, partially broken away, of a bushing-type damping device constructed according to the preferred embodiment of the present invention.

A portion of the lower or second section 50 forms a piston-like surface 64 which opens on a first fluid holding chamber 66. A second fluid holding chamber 70 is generally formed between the second section 50 and the inner face 11 of the housing 10. With reference now to FIG. 1, the second chamber 70 is in fluid communication with the first chamber 66 through a first fluid passageway 72. A rigid body or partition plate 80 can be mounted on a containerized housing 82 such that the first fluid passage 72 is defined by a transverse aperture extending through the housing. The plate 80 is secured between a base wall 84 of the second section 50, the base wall being substantially formed by the rigid shell section or spine section 52 thereof, and a confronting wall surface 86 of the retainer.

A main portion of the retainer 82, which can be made of a suitable metal, or plastic if desired, fits in a flanged section 88 of the second section 50 with a cap section 90 of the retainer fitting over the top of the base wall 84. Also provided is a diaphragm 94 which forms a second end of the second chamber 70. The diaphragm, which is made of a suitable elastomer, has an outer or rim section 96 and an indented main section 98 with an inner surface 100 that faces the second chamber 70. Located on the surface 100 typically is a thickened portion 101.

As shown in FIG. 5, the diaphragm also has an outer-surface 102 which faces the outer housing inner face 11. A central portion of the outer surface is provided with spaced dimples 103. Extending through the outer tube adjacent the diaphragm 94 is provided at least one aperture 104. The aperture allows ambient air to communicate with the outer surface 102 of the diaphragm to provide ambient pressure on that surface.

The thickened portion 101 is advantageous in order to provide extended durability for the diaphragm 94. The dimples 103 are advantageous in order to prevent the diaphragm from fully contacting the inner face 11 of the outer tube 10. If such contact is made across the full surface of the diaphragm, such as under extreme load conditions, then some of the diaphragm may be forced to extend into the aperture 104. This may rupture the diaphragm 94, thus disabling the entire damping device.

Preferably, the elastomer from which the elastomeric body 36 of the upper section 32 and the elastomeric body 54 of the lower section 50 are made is a suitable, conventional rubber material such as natural rubber, butyl rubber or the like which has been provided with the suitable types of additives utilized for this type of application. The diaphragm 94 can be made of a similar rubber material.

The plate 80 is meant to control fluid flow through the first passage 72. In this embodiment, the plate completely blocks fluid flow at the end locations of the plate in the chamber. The up and down motion of the plate 80 in the chamber can be approximately 0.2 mm. It is noted that the plate 80 is made of a plastic material. This is advantageous because plastic is not as noisy as a metal plate would be and a plastic plate also has less mass effect than would a metal plate.

Figure 4:
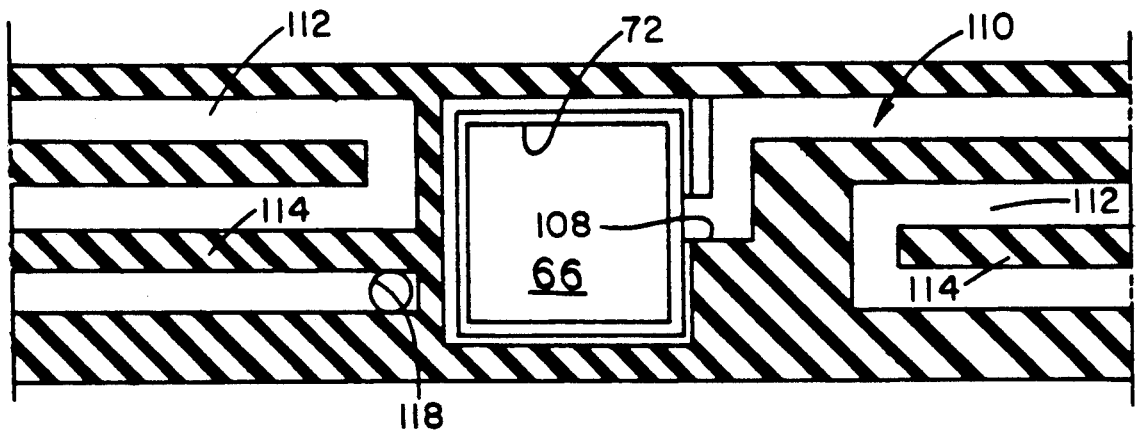
FIG. 4 is a developed view of a fluid channel system of the damping device of FIG. 1.

When fluid flow through the first passage 72 is blocked by the plate 80, fluid can still flow out of the first chamber 66 through a first port 118 into a second "tuned" flow passage 110, which is best illustrated in the developed view of FIG. 4. The second fluid passage 110 extends from the first chamber 66 to the second chamber 70 and is defined between the first and second sections 32 and 50 and the inner face 11 of the outer housing 10. The passage 110 is formed by a plurality of grooves 112 which are separated by ribs 114. As mentioned, the first outlet port 118 communicates the first chamber 66 with the flow passage 110 and second outlet port 108 communicates the second fluid chamber 70 with the passage or channel 110.

When the mount is assembled, both sections 32 and 50 need to be compressed, as best shown by comparing FIGS. 1 and 6, in order to fit within the outer housing 10. After assembly, the mount is held in place by the outer housing 10. It should be noted that a complete leak-proof passage or channel 110 is provided by the cooperation of the first and second sections 32 and 50 when they are enclosed in the outer housing 10, due to the compression of the elastomeric bodies 36 and 54 against each other in the shell 10.

In order to assemble the upper and lower halves 32 and 50 into the outer tube 10 while providing fluid for the channels 112, the assembly process can take place in a tub of the fluid. Conventionally, an ethylene glycol and water mixture is provided as the working fluid of the system. However, it should be recognized that any other suitable antifreeze-type fluid such as propylene glycol and a water mixture could also be utilized.

An aperture 190 extends longitudinally between the first and second sections 32 and 50 of the elastomeric spring assembly 30 in order to communicate the spring with the environment. When the engine, which is mounted on the bushing, generates small amplitude, high frequency vibrations, then the displacement of the plate 80 in a direction normal to the chamber in which it sits compensates for the deformation of the elastomeric spring assembly 30 and the variation in the volume of the first and second chambers 66 and 70 so that there is substantially no transfer of liquid from one chamber to the other.

When, in contrast, the bushing experiences low frequency, high amplitude vibrations, such as may be due to the unevenness of the road surface over which the vehicle is riding, the spring assembly 30 is deformed to such an extent that it can no longer be compensated for by the range of movement available to the plate 80. As soon as the plate contacts either the base wall 84 or the retainer wall 86, the elastomeric spring greatly stiffens and the first fluid passage 72 is sealed off. Fluid flow in this circumstance occurs between the first chamber 66 and the second chamber 70 through the restricted "tuned" flow passage 110. However, this flow path takes considerably more time than would flow through the first passage 72. In this case, the prevention of fluid flow through the first passage 72 provides beneficial damping for the attenuation of relative movement between the engine and the frame.

In summary, at a low displacement, a low spring rate will be encountered with essentially no fluid movement. However, at a high displacement, a high spring rate will be encountered and therefore there will be a large damping action due to the movement of the fluid. A damping of vibrations at approximately 7 to 11 hz has been found to be the optimum or best peak damping frequency for a wide range of vehicle engine mounting applications, including both spark ignition and diesel-type engines.

In the preferred embodiment, two different spring rates are provided in opposite directions in one package while keeping the overall damping characteristics of a conventional bushing. The elastomeric body 36 of the first section 32 has a first spring rate $K_1$ whereas the elastomeric body 54 of the second section 50 has a different second spring rate $K_2$. The forces on the first section 32 are equal to the forces on the second section 50 when both are held in the housing 10. Since $KX = F$ then $K_1 X_1 = K_2 X_2 = F$ and $X_1 + X_2$ equals the total distance of compression C of the sections 32 and 50 in the housing 10. The amount of deflection in the first section 32 and the second section 50 can be calculated as follows:

$$K_1 X_1 = K_2 X_2 \text{ and } X_1 + X_2 = C, \text{ therefore,}$$
$$X_1 = C K_2 / (K_1 + K_2)$$

For a compression distance C of the device, the two spring rates $K_1$ and $K_2$ are in series. Adding the rates in series results in a total rate $K_T$:

$$K_T = \frac{K_1 \times K_2}{K_1 + K_2}.$$

Figure 7:
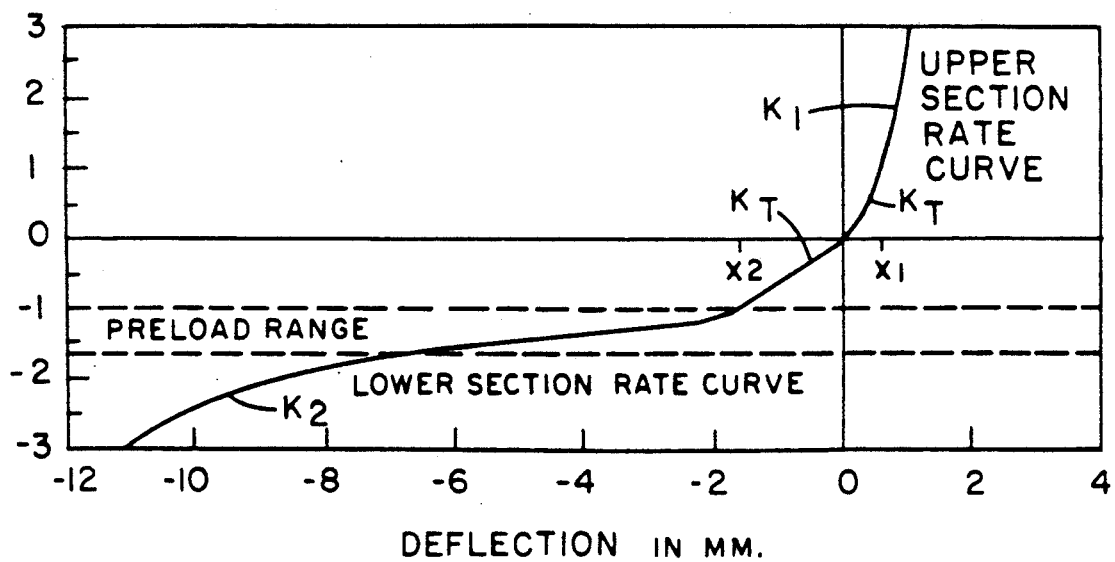
FIG. 7 is a force vs. deflection chart illustrating the functioning of the damping device of FIG. 1.

The force vs. deflection curve for the assembled mount would look as shown in FIG. 7 in a situation where $K_1 < K_2 < K_T$.

In this connection, the durometer of the upper section, or first section 32 can be approximately 40-55. The durometer of the second section 50 will be on the order of 45-55. However, the durometers of any upper and lower section used together in one shell 10 will generally be different. The diaphragm 94 can be made of an elastomer having a durometer of approximately 40. Of course, any other suitable elastomer durometers can also be utilized for the elastomeric spring assembly 30 or the diaphragm.

One typical way of having two different spring rates $K_1$ and $K_2$ would be to provide elastomers of a different compound for the first section 32 and the second section 50, and thus respectively different durometers. Typically, the spring rate of an elastomer is controlled by the configuration and the durometer of the elastomer. The rates of compression of the elastomers in the upper section 32 and the lower section 50 are such that the bushing could be soft in a downward direction but be relatively hard in the upward direction, thereby preventing the associated engine from moving too far upwardly. Such a construction is illustrated in the graph of FIG. 7.

While the durometers of the upper and lower sections 32 and 50 are in most applications different, it is not necessarily the case that the durometer of the upper section is higher than is the durometer of the lower section, as in the force vs. deflection graph of FIG. 7. In some applications it may be necessary that the durometer of the lower section is higher than the durometer of the upper section. For example, this construction could be employed when it is desired to allow more travel in an upward direction than in a downward direction in the damping device. This may be necessary in a situation where the positioning of the engine in the engine compartment is not such as to constrain upward motion in the engine compartment but is so as to constrain downward motion in the compartment.

The pre-loading of the bushing, as is illustrated in FIG. 6, by the line identified "load", will further deform the lower elastomeric body 54 to such an extent that it barely separates away from the upper elastomeric body 36 such that the sleeve engaging surfaces 42 separate from the sleeve 12 by two or three millimeters. This construction will serve to isolate high frequency low amplitude vibrations but allow a damping of low frequency high amplitude vibrations in extreme amplitude occurrence since the upper elastomeric body 36 will then contact the sleeve 12.

The damping of the fluid bushing will be optimum by utilizing the area of the second section 50. Fluid in fluid channels 112 will be kept in the spring assembly 30 by sealing off any exposed surface through compression of the spring assembly 30 against the outer housing 10.

Damping is also achievable in a direction opposite the loading of the engine onto the bushing as is shown in FIG. 6 by keeping a small reservoir of fluid between the decoupler plate 80 and the rubber diaphragm 94 throughout the mount's full range of motion. Pressure fluid in this area will also equal atmospheric pressure.

Tuning of the bushing A can be effected not only by a change in the geometry of the flow passage 110 but also by a control of the hardness or durometer of the elastomer from which the spring sections 32 and 50 and the diaphragm are made.

As mentioned, the inner sleeve 12 is provided with a pair of arms or wings 18. These can be adjusted in size, i.e., lengthened or shortened as necessary in order to control the rate of deflection of the bushing in a radial or side to side direction. More specifically, if the wings 18 are longer, then the bushing is not capable of deflecting as much in a side to side direction because the wings 18 will contact the upper and lower frame members 34 and 52. Additionally, the wings are advantageous in order to improve the durability of the bushing structure. During long downstrokes, the bottom sides of the wings will contact the rubber or elastomer 54 of the lower member 50 in order to help support the load on the top surface of the inner sleeve 12.

Additionally, tuning can be achieved by controlling the shape of the piston-like surface 64. Other ways of tuning the system would include changing the viscosity of the fluid which is contained in the channels. It should also be recognized that yet another way of tuning the system is by precharging the fluid reservoir or by taking fluid out of the reservoir.

This embodiment is also advantageous in that the aperture or port 104 provided in the outer housing 10 can be employed in an active damping system in which a pressurized gas could be admitted into the housing 10 through the aperture 104. The gas would then act on the free or outer surface 102 of the diaphragm 94 thereby changing the stiffness of the damping device. If desired, pressurized gas could also be admitted into the aperture 190 formed through the elastomeric spring assembly 30 if the ends thereof are closed off in order to change the stiffness of the elastomeric spring assembly 30.

The invention has been described with reference to a preferred embodiment. Obviously, modifications and alterations will occur to others upon a reading and understanding of this specification. It is intended to include all such modifications and alterations insofar as they come within the scope of the appended claims or the equivalents thereof.

Having thus described the preferred embodiments, the invention is claimed as follows:

1. A vibration damping device of the bushing type comprising:
   a rigid inner member having a first side and a second diametrically opposed side;
   a rigid outer housing which is axially parallel to said inner member and encloses a substantial portion thereof.
   a first vibration absorbing resilient body interposed between said first side of said inner member and said outer housing, said first resilient body not being affixed to the inner member and comprising an elastomer having a first spring rate; and
   a second vibration absorbing resilient body separate from the first body and interposed between said second side of said inner member and said outer housing, said second resilient body being affixed to the inner member and comprising an elastomer having a second spring rate, wherein said second resilient body spring rate is different than said first resilient body spring rate such that a deflection of said rigid inner member toward said first resilient body will be resisted more strongly than a deflection of said rigid inner member toward said second resilient body.

2. The device of claim 1, wherein said elastomer of the first resilient body has a durometer different from the durometer of said elastomer of the second resilient body.

3. The device of claim 2, wherein said second resilient body further includes a first fluid holding chamber.

4. The device of claim 3 further comprising a second fluid holding chamber which is in fluid communication with said first fluid holding chamber through a first passageway, said second fluid holding chamber being generally defined between said outer housing and said second resilient body.

5. The device of claim 4 further comprising:
   a rigid body which is movably mounted in said first passageway for movement perpendicular to a longitudinal axis of the device for controlling fluid flow between said first and second fluid chambers and, at two end positions of movement of said rigid body, blocking substantially all fluid flow between said first and second passageways;
   a means for providing a second path of fluid flow between said first and second fluid chambers; and
   a diaphragm defining one wall of said second fluid holding chamber.

6. The device of claim 5 further comprising a housing in which said rigid body is movably mounted and wherein said rigid body comprises a plate.

7. The device of claim 5 wherein said diaphragm includes an outer surface adapted to contact an inner face of said rigid outer housing, said outer surface includes a plurality of spaced dimples.

8. The device of claim 1 wherein said first and second resilient bodies together define a substantially cylindrical resilient structure, when both bodies are held in said rigid outer housing.

9. The device of claim 8 wherein said first resilient body includes a first rigid support section, and wherein said second resilient body includes a second rigid support section, and wherein said first and second support sections are spaced from each other by a section of said second resilient body.

10. The device of claim 1 wherein a longitudinal axis of said inner member is spaced away from a longitudinal axis of said outer housing.

11. The device of claim 1 wherein said rigid inner member comprises a tubular section and a pair of radially extending wings located on one of said first and second sides of said tubular section.

12. The device of claim 1 wherein the durometers of said first and second vibration absorbing resilient bodies are so proportioned that when said rigid inner member is loaded, with a weight the second resilient body deflects to the extent that it is then spaced away from the first resilient body leaving a gap therebetween.

13. A fluid filled elastomeric vibration damping device of the bushing type which can be used to isolate a vibration generating member from an associated support member comprising:
   a rigid outer housing;
   a rigid inner member which is substantially enclosed by said outer housing, said inner member having a first side and a second side;
   a first vibration absorbing resilient body interposed between said first side of said inner member and said outer housing, said first body not being affixed to the inner member and comprising an elastomeric material having a first spring rate;
   a second vibration absorbing resilient body separate from the first body and interposed between said second side of said inner member and said outer housing, wherein sand second body is affixed to the inner member and comprises an elastomeric material having a second spring rate which is different from said first spring rate, such that a deflection of said rigid inner member toward one of said first and second bodies will be resisted more strongly than a deflection of said rigid inner member toward the other of said first and second bodies, and wherein a first fluid chamber is defined in said second body;
   a second fluid chamber defined between at least said second body and said outer housing, said second fluid chamber being in fluid communication with said first chamber through a first fluid passageway;
   a plate movably mounted in said first passageway for movement perpendicular to a longitudinal axis of the device, said plate controlling a flow of fluid through said first passageway to a varying extent depending upon the position of said plate in said first passageway; and
   a second fluid passageway which communicates said first and second fluid chambers through a circuitous path.

14. The device of claim 13 further comprising a retainer, wherein said plate is mounted between a shoulder defined in said second resilient body and said retainer.

15. The device of claim 13 further comprising a diaphragm closing off said second fluid chamber.

16. The device of claim 15 wherein said outer housing is provided with at least one aperture adjacent said diaphragm to communicate a side of said diaphragm with a source of gas.

17. The device of claim 16 wherein said source of gas provides a pressurized gas to allow active damping by the device.

18. The device of claim 13 wherein said rigid inner member comprises a tubular section and a pair of radially extending wings located on one of said first and second sides of said tubular section.

19. An improved vibration isolating and damping bushing of the type having an elongated rigid outer housing surrounding a elongated rigid inner member, opposing forces being respectively applicable to the housing and the member perpendicularly to their major axes, which are generally parallel; a first resilient body interposed between the housing and the member; the first body defining first and second fluid chambers defined interconnected by a first passageway which holds a plate for movement between two extreme positions therein to control fluid flow between the chambers, the plate blocking fluid flow between the chambers in its extreme positions; and a second passageway through which the fluid flows between the chambers when the plate is in the extreme positions; wherein the improvement comprises:

the first resilient body being interposed between a first side of the inner member and the housing and being affixed to the first side of the inner member, a second resilient body separate from the first body and not attached to the inner member, the second resilient body being interposed between a second side of the inner member and the housing, the first and second sides being generally diametrically opposed along the direction of the opposing forces.

the housing compressing and preloading the resilient bodies against the inner member along the direction of the opposing forces, and the application of a static load to the inner member along the direction of the forces with the housing held stationary further preloading the first resilient body and spacing the inner member from the second resilient body;

whereby high frequency, low amplitude vibratory forces applied to the inner member are isolated from the housing by the action of the plate moving between its extreme positions, and low frequency, high amplitude forces applied to the inner member are (1) damped by the action of the first resilient body, the plates, the passageways and the chambers when the inner member moves toward and away from the first resilient body and (2) additionally damped by the action of the second resilient body after the inner member moves by the amount of the spacing toward the second resilient body.

20. An improved bushing as in claim 19, wherein the durometer of the first resilient body is different from the durometer of the second resilient body.

21. An improved bushing as in claim 20, wherein the durometer of the first resilient body is higher than that of the second resilient body.

* * * * *